United States Patent
Bae et al.

(10) Patent No.: US 9,927,645 B2
(45) Date of Patent: *Mar. 27, 2018

(54) CURVED DISPLAY DEVICE

(71) Applicant: SAMSUNG DISPLAY CO., LTD., Yongin-si, Gyeonggi-do (KR)

(72) Inventors: Kwang Soo Bae, Suwon-si (KR); Yu Jin Kim, Hwaseong-si (KR); Taimei Kodaira, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 140 days.

This patent is subject to a terminal disclaimer.

(21) Appl. No.: 14/995,123

(22) Filed: Jan. 13, 2016

(65) Prior Publication Data

US 2016/0209700 A1 Jul. 21, 2016

(30) Foreign Application Priority Data

Jan. 21, 2015 (KR) .................. 10-2015-0010085

(51) Int. Cl.
*G02F 1/13* (2006.01)
*G02F 1/1333* (2006.01)
*G02F 1/1343* (2006.01)

(52) U.S. Cl.
CPC .. *G02F 1/133377* (2013.01); *G02F 1/133371* (2013.01); *G02F 2001/134345* (2013.01)

(58) Field of Classification Search
CPC .................. G02F 1/133377; G02F 1/133371
USPC ............................ 349/1, 43, 143
See application file for complete search history.

(56) References Cited

U.S. PATENT DOCUMENTS

| 9,298,029 | B2 * | 3/2016 | Choi ................. G02F 1/133377 |
| 9,356,050 | B2 * | 5/2016 | Cha .................. G02F 1/133377 |
| 2015/0212365 | A1 * | 7/2015 | Beon ................. G02F 1/133377 349/43 |
| 2016/0124260 | A1 * | 5/2016 | Bae .................. G02F 1/133377 349/43 |

FOREIGN PATENT DOCUMENTS

| KR | 10-2005-0096368 A | 10/2005 |
| KR | 10-2008-0029397 A | 4/2008 |
| KR | 10-2013-0062110 A | 6/2013 |
| KR | 10-2013-0129008 A | 11/2013 |
| KR | 10-2014-0002491 A | 1/2014 |

* cited by examiner

*Primary Examiner* — Hoan C Nguyen
(74) *Attorney, Agent, or Firm* — Innovation Counsel LLP

(57) ABSTRACT

A curved display device includes: a substrate including a display area; a plurality of thin film transistors disposed on the substrate; a plurality of pixel electrodes respectively connected to the plurality of thin film transistors; a liquid crystal layer disposed on the pixel electrodes and filling a plurality of microcavities; a common electrode facing the plurality of pixel electrodes and separated with the plurality of microcavities; and a roof layer formed on the common electrode. The plurality of microcavities are formed in a matrix form including a plurality of columns and rows, and the display area includes an edge portion and a center portion. A first height of the plurality of microcavities formed at the edge portion of the display area is lower than that a second height of the plurality of microcavities formed at the center portion of the display area. An area of a pixel disposed at the edge portion of the display area may be adjusted such that light leakage and spots at the edge portion may be improved.

12 Claims, 8 Drawing Sheets

CURVED DISPLAY DEVICE

CROSS-REFERENCE TO RELATED APPLICATION

This application claims priority to and the benefit of Korean Patent Application No. 10-2015-0010085 filed in the Korean Intellectual Property Office on Jan. 21, 2015, the disclosure of which is incorporated herein by reference in its entirety.

BACKGROUND (a) Field

The present disclosure relates to a curved display device made of one substrate.

(b) Description of the Related Art

Display devices are required for computer monitors, televisions, mobile phones, and the like. Examples of such display devices include a cathode ray tube (CRT) display, a liquid crystal display (LCD), and a plasma display panel (PDP). As one of the most widely used flat panel displays at present, a liquid crystal display (LCD) includes two display panels on which field generating electrodes such as a pixel electrode and a common electrode are formed, and a liquid crystal layer interposed between the two display panels. When an electric field is generated on a liquid crystal layer by applying a voltage to the field generating electrodes, alignment directions of liquid crystal molecules of the liquid crystal layer change by the electric field, and the polarization of incident light is controlled to display an image on the LCD display.

The two display panels of the LCD may include a thin film transistor array panel and an opposing display panel. On the thin film transistor array panel, a gate line for transmitting a gate signal and a data line for transmitting a data signal are formed to cross each other. Further, a thin film transistor connected to the gate and data lines, a pixel electrode connected to the thin film transistor, and the like may be formed on the thin film transistor array panel. On the opposing display panel, a light blocking member, a color filter, a common electrode, and the like may be formed. In some embodiments, the light blocking member, the color filter, and the common electrode may be formed on the thin film transistor array panel.

However, in conventional LCDs, two substrates (e.g., two display panels) are required, and constituent elements are respectively formed on the two substrates, thereby requiring a long processing time as well as making the display device heavy, thick, and costly. In addition, when the two substrates are formed in a curved shape, misalignment between the two substrates may occur.

The above information disclosed in the background section is only for facilitating the understanding of the background information of the present disclosure, therefore it may contain information that does not form a prior art and is already known to a person of ordinary skill in the art.

SUMMARY

The present disclosure has been made in an effort to provide a curved display device with one substrate such that weight, thickness, cost, and manufacturing process time may be reduced, and light leakage at an edge portion thereof may be improved through an adjustment of cell gaps.

An exemplary embodiment of the present disclosure provides a curved display device including: a substrate including a display area; a plurality of thin film transistors disposed on the substrate; a plurality of pixel electrodes respectively connected to the plurality of thin film transistors; a liquid crystal layer disposed on the plurality of pixel electrodes and filling a plurality of microcavities; a common electrode facing the plurality of pixel electrodes and separated with the plurality of microcavities; and a roof layer formed on the common electrode. The plurality of microcavities are formed in a matrix form including a plurality of columns and rows, and the display area includes an edge portion and a center portion. A first height of the plurality of microcavities formed at the edge portion of the display area is lower than a second height of the plurality of microcavities formed at the center portion of the display area.

Heights of the plurality of microcavities may be gradually higher toward the center portion from the edge portion.

A difference of the heights of the plurality of microcavities may be formed in a long side direction or a short side direction of the substrate.

The first height of the microcavity formed at the edge portion of the display area may be about 2.5-2.8 μm, and the height of the microcavity formed at the center portion of the display area may be about 3-5 μm.

The roof layer may include an injection hole that exposes the plurality of microcavities and is separated from the plurality of microcavities.

The curved display device may further include an alignment layer formed on an inner surface of the plurality of microcavities.

The curved display device may further include an overcoat formed on an entire upper surface of the roof layer and covering the injection hole.

A difference of the heights of the plurality of microcavities may be formed in a long side direction and a short side direction of the substrate.

According to an embodiment of the present disclosure, the curved display device is manufactured using one substrate, thereby reducing weight, thickness, cost, and manufacturing process time of the curved display device, and improving light leakage at an edge portion thereof through an adjustment of cell gaps.

DETAILED DESCRIPTION OF THE EMBODIMENTS

Figure 1A:
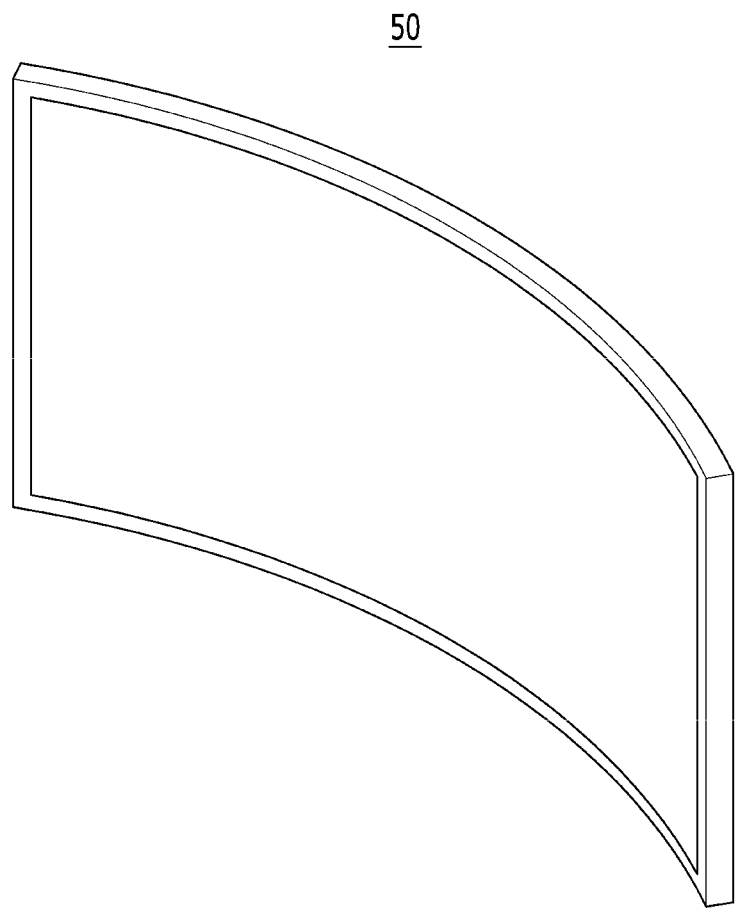
FIGS. 1A and 1B are a perspective view and a top plan view schematically illustrating a curved display device, according to an exemplary embodiment of the present disclosure, respectively.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a curved display device, according to an exemplary embodiment of the present disclosure, will be described with reference to FIGS. 1 to 3. In exemplary embodiments, the curved display device refers to a display device in which short sides or long sides thereof are curved with a predetermined curvature in one selected direction.

Figure 1B:
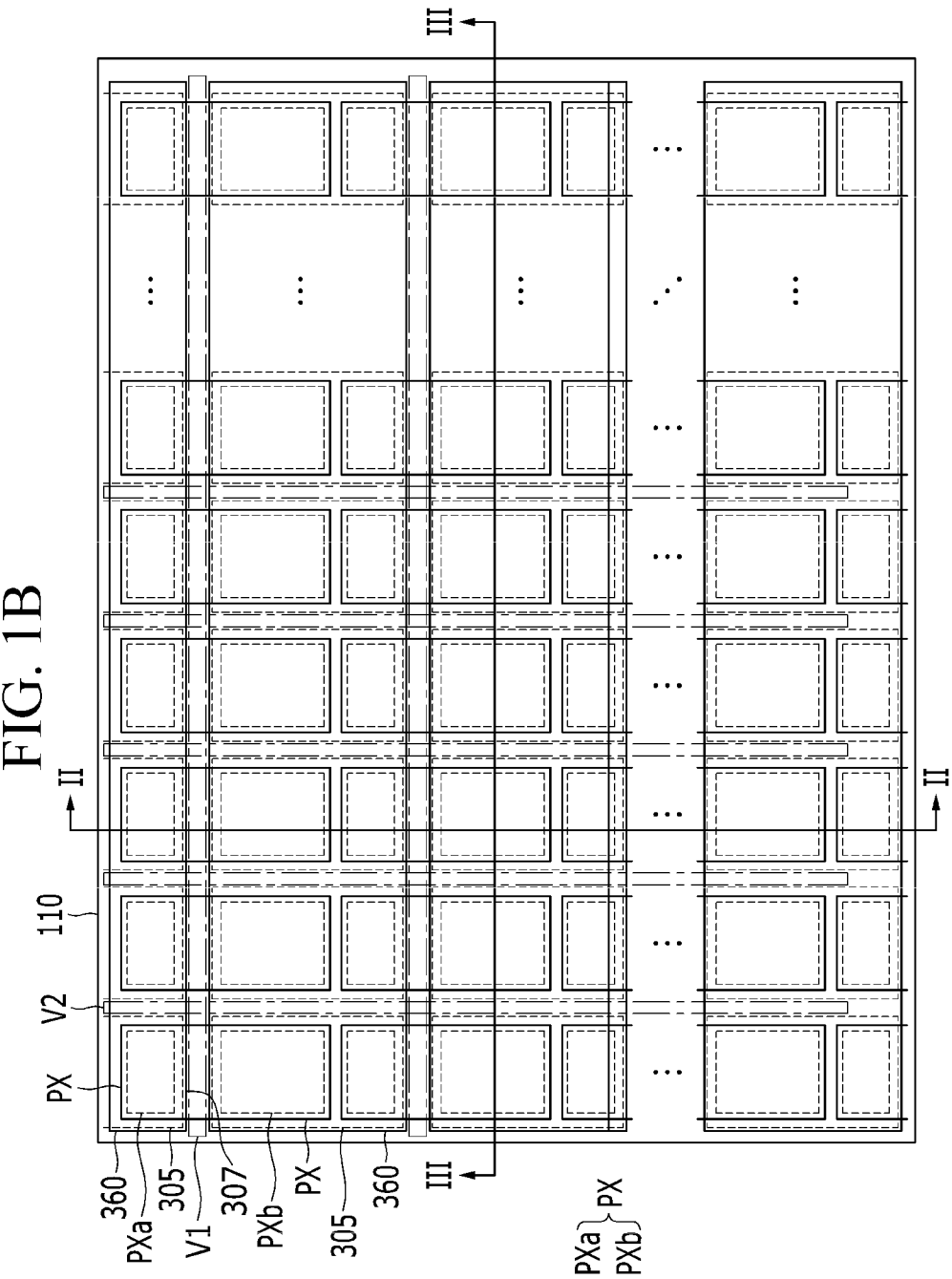
Figure 2:
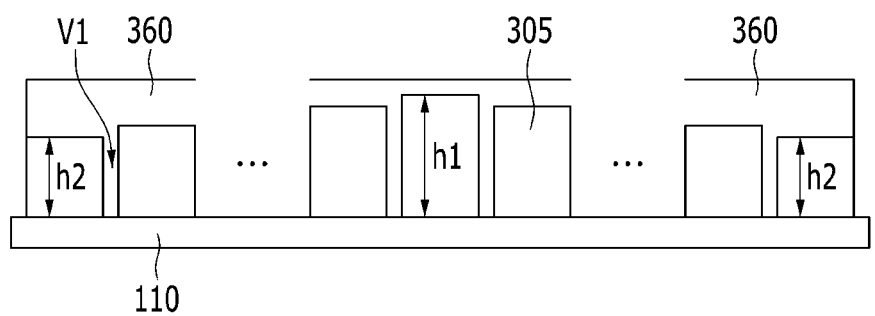
FIG. 2 is a cross-sectional view of FIG. 1B taken along line II-II.
Figure 3:
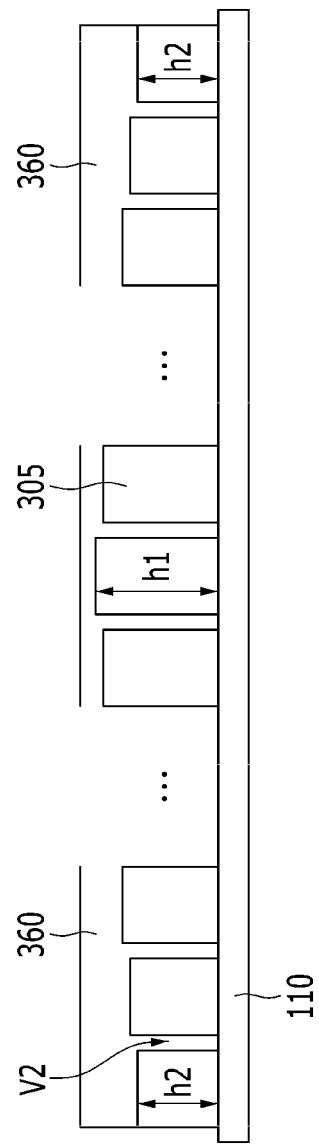
FIG. 3 is a cross-sectional view of FIG. 1B taken along line III-III.

FIGS. 1A and 1B are a perspective view and a top plan view schematically illustrating a curved display device, according to an exemplary embodiment of the present disclosure, respectively, FIG. 2 is a cross-sectional view of FIG. 1B taken along line and FIG. 3 is a cross-sectional view of FIG. 1B taken along line III-III.

The curved display device 50 includes a substrate 110 made of glass or plastic, and a roof layer 360 formed on the substrate 110. The substrate 110 includes a plurality of pixels PX. The pixels PX are disposed in a matrix form including a plurality of pixel columns and a plurality of pixel rows. Each pixel PX may include a first subpixel PXa and a second subpixel PXb. The first subpixel PXa and the second subpixel PXb may be vertically disposed. A first valley V1 is disposed in a pixel row direction between the first subpixel PXa and the second subpixel PXb, and a second valley V2 is disposed between pixel rows.

The roof layer 360 is formed in a pixel row direction. The roof layer 360 is removed in the first valley V1 for forming an injection hole 307 to expose constituent elements under the roof layer 360 to the outside. Each roof layer 360 is formed to be separated from the substrate 110 between adjacent second valleys V2, such that a microcavity 305 is formed. In addition, each roof layer 360 is formed to be attached to the substrate 110 in the second valley V2 to cover opposing lateral surfaces of the microcavity 305. In other words, the roof layer 360 is formed to be attached to the substrate 110 in the second valley V2 to form opposing lateral walls of the microcavity 305.

A liquid crystal layer (not shown) including a liquid crystal material is formed in the microcavity 305, and the microcavity 305 including the liquid crystal layer is disposed on the substrate 110 in a matrix form including a plurality of columns and rows in a similar fashion as the pixels PX are disposed.

FIG. 2 is a schematic cross-sectional view of a cell gap of the curved display device 50 taken along a short side direction. FIG. 3 is a schematic cross-sectional view of a cell gap of the curved display device 50 taken along a long side direction. The substrate 110 of the curved display device 50 includes a display area for displaying images. The display area includes an edge portion and a center portion of the substrate 110.

Cell gaps h1 and h2 represented as heights of the microcavity 305 of the curved display device 50 may be formed gradually toward the center portion of the substrate 110 from the edge portion of the substrate 110. The heights h1 and h2 of the microcavity 305 may be gradually increased toward the center portion of the substrate 110 from the edge portion of the substrate 100.

Herein, the edge portion of the substrate 110 represents a portion of four edges of the substrate 110, and the center portion thereof represents an intersection of two diagonals across the substrate 110. The cell gaps h1 and h2 may be gradually higher toward the center portion of the substrate 110 from the edge portion of the substrate 100 in a long side and/or in a short side direction of the substrate 110, but are not limited thereto.

According to one embodiment, when the curved display device 50 is formed with a curvature in the long side direction, the cell gaps h1 and h2 of the microcavities 305 may be formed to be gradually changing only in the long side direction. According to another embodiment, when the curved display device 50 is formed with a curvature in the short side direction, the cell gaps h1 and h2 of the microcavities 305 may be formed to be gradually changed only in the short side direction. According to yet another embodiment, when the curved display device 50 is formed with the curvatures in the long and short side directions, the cell gaps h1 and h2 of the microcavities 305 may be formed to be gradually changed both in the long side and the short side directions. In other words, when the curved display device is formed with a curvature in the long side direction, cell gaps of the microcavities 305 disposed in the same row may be the same, and when the curved display device is formed with a curvature in the short side direction, cell gaps of the microcavities 305 disposed in the same column may be the same. According to one embodiment, a cell gap h1 (hereinafter also referred to as a central cell gap) of the microcavity 305 disposed at the center portion of the substrate 110 is about 3-5 μm, and a cell gap h2 (hereinafter also referred to as an edge cell gap) of the microcavity 305 disposed at the edge portion of the substrate 110 is about 2.5-2.8 μm.

When bending the substrate 110 to make a typical flat panel display device a curved display device, a stress is applied to the substrate 110. A phase retardation (And) occurs inside the substrate 110 due to the stress applied to the substrate 110, and birefringence of light emitted from a backlight may occur thereat.

Particularly, the phase retardation at the edge portion of the substrate 110 is greater than that at the center portion of the substrate 110, thus birefringence of light occurs at the edge portion of the substrate 110 causing light leakage at the edge portion of the substrate 100.

In the curved display device 50, the phase retardation at the edge portion of the substrate 110 may be reduced to decrease the birefringence of light by forming the edge cell gap h2 to be smaller than the central cell gap h1, thereby preventing light leakage that may occur at edge portions of the substrate 100. In addition, the cell gaps of the microcavities 305 are gradually higher toward the center portion from the edge portion, thereby preventing display quality defects that may occur due to a difference between cell gaps of the adjacent microcavities 305.

When the edge cell gap h2 is less than about 2.5 μm, a luminance difference between the edge portion and the center portion is larger compared to a case when the edge cell gap h2 is more than about 2.8 μm. To achieve the reduction of the luminance difference, the central cell gap h1 may be about 3-5 μm, and the edge cell gap h2 may be about 2.5-2.8 μm.

The aforementioned structure of the curved display device 50, is merely an example, and it may be variously modified. For example, a structure in which the pixel PX, the first valley V1, and the second valley V2 are disposed may be varied, a plurality of roof layers 360 may be connected to each other in the first valley V1, and a portion of respective roof layers 360 may be formed to be separated from the substrate 110 in the second valley V2 such that the adjacent microcavities 305 may be connected to each other.

Figure 4:
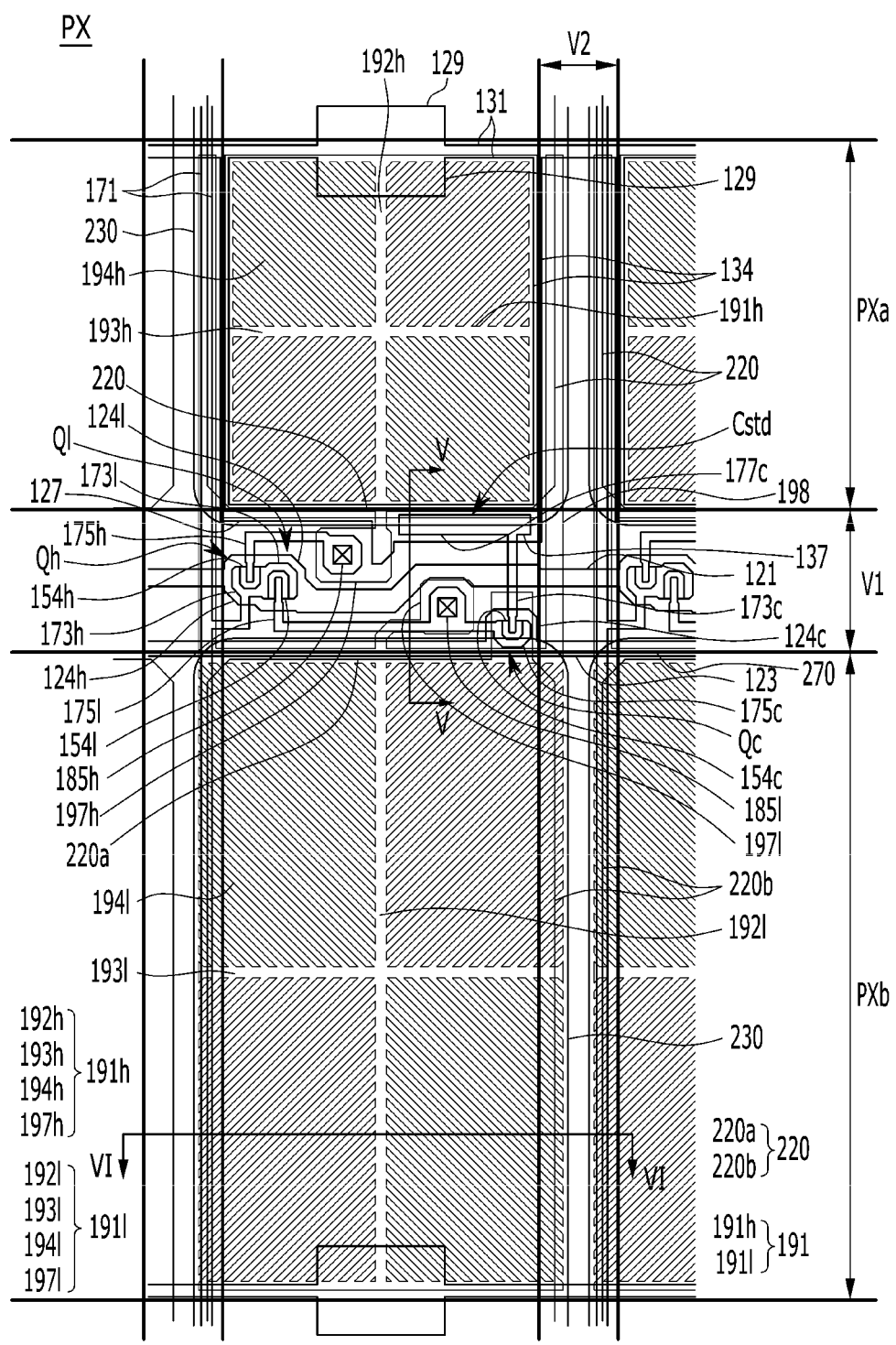
FIG. 4 is a planar layout view of one pixel area of a curved display device, according to an exemplary embodiment of the present disclosure.
Figure 5:
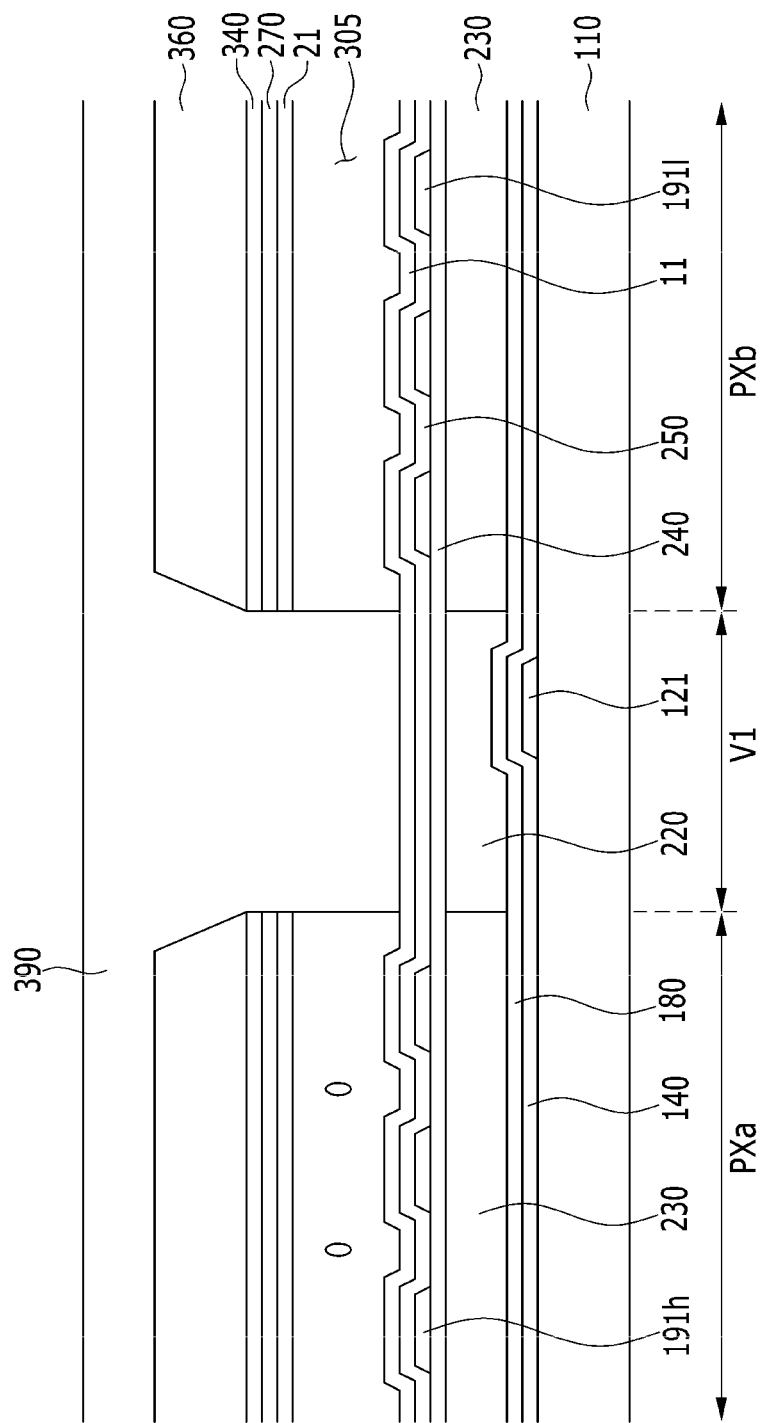
FIG. 5 is a cross-sectional view of FIG. 4 taken along line V-V.
Figure 6:
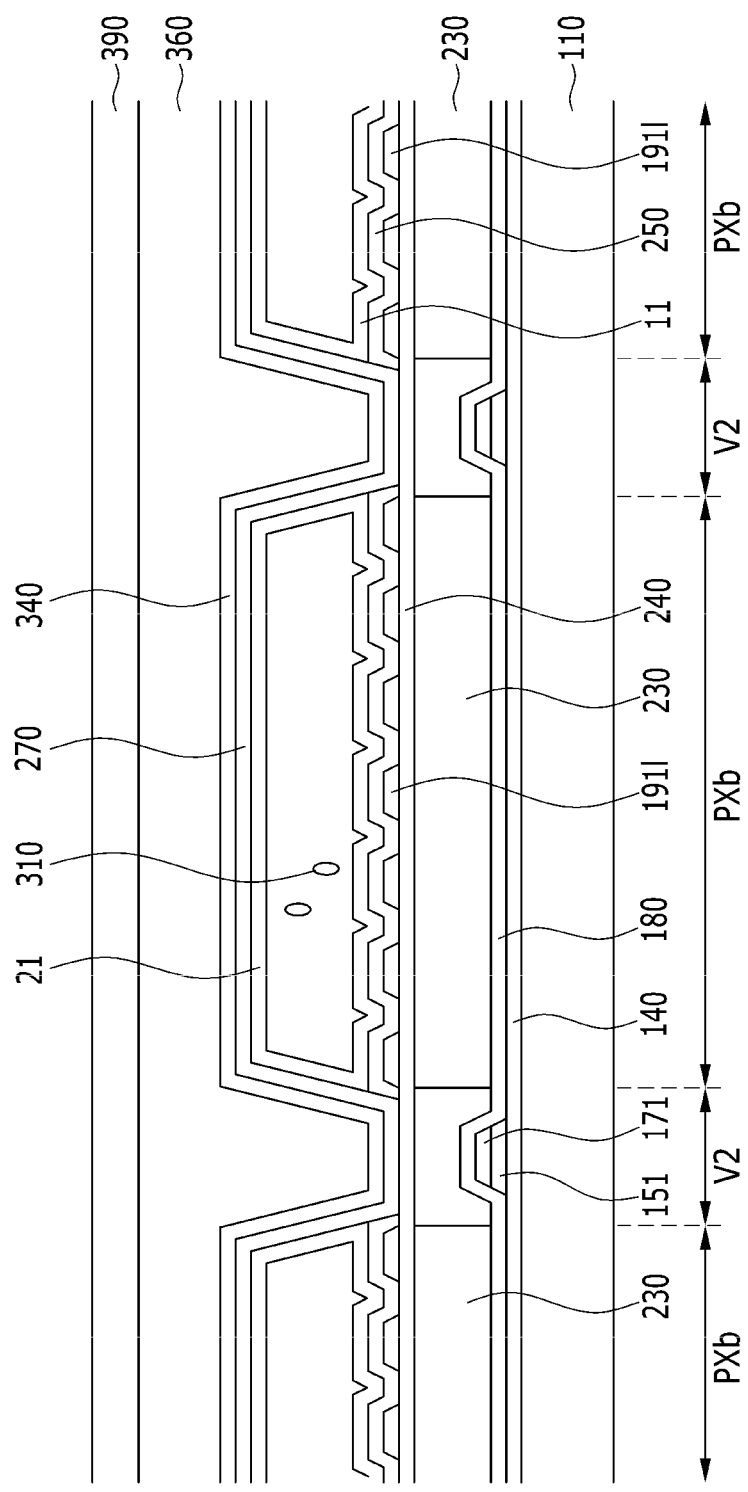
FIG. 6 is a cross-sectional view of FIG. 4 taken along line VI-VI.

Pixels of the curved display device 50, will be described in detail with reference to FIGS. 4 to 6. FIG. 4 is a planar layout view of one pixel area of the curved display device, according to the exemplary embodiment of the present disclosure. FIG. 5 is a cross-sectional view of FIG. 4 taken along line V-V. FIG. 6 is a cross-sectional view of FIG. 4 taken along line VI-VI.

Referring to FIGS. 4 to 6, a plurality of gate conductors including a plurality of gate lines 121, a plurality of step-down gate lines 123, and a plurality of storage electrode lines 131 are disposed on the substrate 110. The gate lines 121 and the step-down gate lines 123 mainly extend in a horizontal direction to transfer gate signals. The gate conductor may include a first gate electrode 124h and a second gate electrode 124l protruding upward and downward from the gate line 121, and may further include a third gate electrode 124c protruding upward from the step-down gate line 123. The first gate electrode 124h and the second gate electrode 124l are connected with each other to form one protrusion. The protrusion form of the first, second, and third gate electrodes 124h, 124l, and 124c may be modified without deviating from the scope of the present disclosure.

The storage electrode line 131 mainly extends in a horizontal direction to transfer a predetermined voltage such as a common voltage Vcom. The storage electrode line 131 includes storage electrodes 129 protruding upward and downward, a pair of vertical portions 134 extending downward to be substantially perpendicular to the gate line 121, and a horizontal portion 127 connecting ends of the pair of vertical portions 134. The horizontal portion 127 includes a capacitor electrode 137 expanded downward.

A gate insulating layer 140 is formed on the gate conductors 121, 123, 124h, 124l, 124c, and 131. The gate insulating layer 140 may be made of an inorganic insulating material such as a silicon nitride (SiNx) and a silicon oxide (SiOx). Further, the gate insulating layer 140 may be formed with a single layer or multiple layers.

A semiconductor line 151, a first semiconductor layer 154h, a second semiconductor layer 154l, and a third semiconductor layer 154c are formed on the gate insulating layer 140. The first semiconductor layer 154h may be disposed on the first gate electrode 124h, the second semiconductor layer 154l may be disposed on the second gate electrode 124l, and the third semiconductor layer 154c may be disposed on the third gate electrode 124c. The first semiconductor layer 154h and the second semiconductor layer 154l may be connected to each other, and the second semiconductor layer 154l and the third semiconductor layer 154c may be connected to each other. Further, the first semiconductor layer 154h may be extended to a lower portion of a data line 171. The first to third semiconductor layers 154h, 154l, and 154c may be made of amorphous silicon, polycrystalline silicon, a metal oxide, or the like.

Ohmic contacts (not illustrated) may be further formed on the first to third semiconductor layers 154h, 154l, and 154c, respectively. The ohmic contact may be made of a silicide or a material such as n+ hydrogenated amorphous silicon in which an n-type impurity is highly doped.

A data conductor including the data line 171, a first source electrode 173h, a second source electrode 173l, a third source electrode 173c, a first drain electrode 175h, a second drain electrode 175l, and a third drain electrode 175c are formed on the first to third semiconductor layers 154h, 154l, and 154c.

The data lines 171 transfer data signals and mainly extend in a vertical direction to cross the gate lines 121 and the step-down gate lines 123. Each data line 171 includes a first source electrode 173h and a second source electrode 173l that extend toward the first gate electrode 124h and the second gate electrode 124l and are connected with each other.

A first drain electrode 175h, a second drain electrode 175l, and a third drain electrode 175c include one wide end portion and the other rod-shaped end portion, respectively. The rod-shaped end portions of the first drain electrode 175h and the second drain electrode 175l are partially surrounded by the first source electrode 173h and the second source electrode 173l. One wide end portion of the second drain electrode 175l is extended to form a third source electrode 173c that is formed in a 'U'-lettered shape. A wide end portion 177c of the third drain electrode 175c is overlapped with the capacitance electrode 137 to form a step-down capacitance Cstd, and the rod-shaped end portion is partially surrounded by the third source electrode 173c.

The first gate electrode 124h, the first source electrode 173h, and the first drain electrode 175h form a first thin film transistor Qh together with the first semiconductor layer 154h, the second gate electrode 124l, the second source electrode 173l, and the second drain electrode 175l form a second thin film transistor Ql together with the second semiconductor layer 154l, and the third gate electrode 124c, the third source electrode 173c, and the third drain electrode 175c form the third thin film transistor Qc together with the third semiconductor layer 154c.

The first semiconductor 154h, the second semiconductor 154l, and the third semiconductor 154c are connected to each other to have a stripe shape, and may have substantially the same planar shape as the data conductors 171, 173h, 173l, 173c, 175h, 175l, and 175c and the ohmic contacts therebelow, except for channel regions between the source electrodes 173h, 173l, and 173c and the drain electrodes 175h, 175l, and 175c. In the first semiconductor layer 154h, an exposed portion that is not covered by the first source electrode 173h and the first drain electrode 175h is disposed between the first source electrode 173h and the first drain electrode 175h. In the second semiconductor layer 154l, an exposed portion that is not covered by the second source electrode 173l and the second drain electrode 175l is disposed between the second source electrode 173l and the second drain electrode 175l. In addition, in the third semiconductor layer 154c, an exposed portion that is not covered by the third source electrode 173c and the third drain electrode 175c is disposed between the third source electrode 173c and the third drain electrode 175c.

A passivation layer 180 is disposed on the data conductors 171, 173h, 173l, 173c, 175h, 175l, and 175c and the semiconductor layers 154h, 154l, and 154c that are exposed between the respective source electrodes (173h, 173l, or 173c) and the respective drain electrodes (175h, 175l, or 175c). The passivation layer 180 may be made of an organic insulating material or an inorganic insulating material, and may be formed with a single layer or multiple layers.

A color filter 230 and a light blocking member 220 are disposed on the passivation layer 180. The color filter 230 may display one of primary colors such as three primary colors of red, green, and blue. The color filter 230 is not limited to the three primary colors of red, green, and blue, but may display other colors such as cyan, magenta, yellow, and white-based colors, and the like.

The light blocking member 220a is formed at a region in which the thin film transistor is disposed. The light blocking member 220a and 220b is formed on a boundary of the pixel area PX and the thin film transistor to prevent light leakage. The color filter 230 may be disposed on a first subpixel area PXa and a second subpixel area PXb, and the light blocking member 220a may be disposed between the first subpixel area PXa and the second subpixel area PXb.

The light blocking member 220 is vertically expanded along an extending direction of the gate line 121 and the step-down gate line 123. The light blocking member 220 may cover a region in which the first thin film transistor Qh, the second thin film transistor Ql, the third thin film transistor Qc, and the like are disposed, or may extend along the data line 171. In other words, the light blocking member 220a and 220b may be disposed at a first valley V1 and a second valley V2. The color filter 230 and the light blocking member 220 may be partially overlapped with each other.

In the passivation layer 180, the color filter 230, and the light blocking member 220, a plurality of first contact holes 185h and a plurality of second contact holes 185l, that expose the wide end portion of the first drain electrode 175h and the wide end portion of the second drain electrode 175l, respectively, are formed. A first insulating layer 240 is disposed on the color filter 230 and the light blocking member 220, and a pixel electrode 191 is disposed on the first insulating layer 240. The common electrode 191 may be made of a transparent metal material such as indium tin oxide (ITO) and indium zinc oxide (IZO).

The pixel electrode 191 includes the first subpixel electrode 191h and the second subpixel electrode 191l that are separated from each other with the gate line 121 and the step-down gate line 123 and disposed above and below the pixel area PX based on the gate line 121 and the step-down gate line 123 to be adjacent to each other in an extending direction of the data line. In other words, the first subpixel electrode 191h and the second subpixel electrode 191l are separated from each other with the first valley V1, the first subpixel electrode 191h is disposed in the first subpixel area PXa, and the second subpixel electrode 191l is disposed in the second subpixel area PXb.

The first subpixel electrode 191h and the second subpixel electrode 191l are connected to the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l.

An overall shape of the first subpixel electrode 191h and the second subpixel electrode 191l is a quadrangle, and the first subpixel electrode 191h and the second subpixel electrode 191l include cross stems including horizontal stems 193h and 193l and vertical stems 192h and 192l that cross the horizontal stems 193h and 193l. Further, the first subpixel electrode 191h and the second subpixel electrode 191l include a plurality of minute branch portions 194h and 194l, and protrusion portions 197h and 197l that protrude upward or downward from edge sides of the subpixel electrodes 191h and 191l, respectively.

The pixel electrode 191 is divided into four subregions by the horizontal stems 193h and 193l and the vertical stems 192h and 192l. The minute branch portions 194h and 194l obliquely extend from the horizontal stems 193h and 193l and the vertical stems 192h and 192l, and the extending direction may form an angle of about 45 degrees or 135 degrees with the gate line 121 or the horizontal stems 193h and 193l. Further, directions in which the minute branches 194h and 194l of two adjacent subregions extend may be perpendicular to each other.

In the exemplary embodiment, the first subpixel electrode 191h further includes an outer stem portion surrounding the outside thereof, and the second subpixel electrode 191l includes horizontal portions disposed at an upper end and a lower end and left and right vertical portions 198 that are disposed at the left and right of the first subpixel electrode 191h. The left and right vertical portions 198 may prevent a capacitive coupling between the data line 171 and the first subpixel electrode 191h. The layout form of the pixel area, the structure of the thin film transistor, and the shape of the pixel electrode described above are just exemplified, and the present disclosure is not limited thereto and may be variously modified.

A second insulating layer 250 is disposed on the pixel electrode 191, and a common electrode 270 is disposed on the pixel electrode 191 to be separated by a predetermined distance from the pixel electrode 191. A microcavity 305 is formed between the pixel electrode 191 and the common electrode 270. The microcavity 305 is surrounded by the pixel electrode 191 and the common electrode 270 to be differentiated for each pixel. A width and an area of the microcavity 305 may be variously modified according to a size and resolution of the display device.

The common electrode 270 may be made of a transparent metal material such as indium tin oxide (ITO) and indium zinc oxide (IZO). A predetermined voltage (e.g., a common voltage Vcom) may be applied to the common electrode 270, and an electric field may be generated between the pixel electrode 191 and the common electrode 270.

A first alignment layer 11 is disposed on the second insulating layer 250. A second alignment layer 21 is formed below the common electrode 270 to face the first alignment layer 11. The first alignment layer 11 and the second alignment layer 21 may be formed with vertical alignment layers and made of an alignment material such as polyamic acid, polysiloxane, and polyimide. The first and second alignment layers 11 and 21 may be connected to each other at an edge of the pixel area PX.

A liquid crystal layer including liquid crystal molecules 310 is formed in the microcavity 305 and positioned between the pixel electrode 191 and the common electrode 270. The liquid crystal molecules 310 have negative dielectric anisotropy, and may stand up in a direction perpendicular to the substrate 110 while the electric field is not applied. That is, a vertical alignment may be implemented.

When data voltage is applied, the first subpixel electrode 191h and the second subpixel electrode 191l generate an electric field together with the common electrode 270 and change directions of the liquid crystal molecules 310 of the microcavity 305 between the two electrodes 191 and 270. As such, luminance of light passing through the liquid crystal layer varies according to the directions of the liquid crystal molecules 310 that is determined by the electric field between the common electrode 270 and the first subpixel electrode 191h and the second subpixel electrode 191l.

A third insulating layer 340 may be further formed on the common electrode 270. The third insulating layer 340 may be made of an inorganic insulating material such as a silicon nitride (SiNx) and a silicon oxide (SiOx), and may be omitted if necessary.

A roof layer 360 is formed on the third insulating layer 340, and may be made of an organic material. The microcavity 305 is formed below the roof layer 360, and the roof layer 360 is hardened by a curing process to maintain a shape of the microcavity 305. The roof layer 360 is formed to be spaced apart from the pixel electrode 191 with the microcavity 305 therebetween.

The roof layer 360 is formed in in each pixel area PX and the second valley V2 along an extending direction of the data line, but is not formed in the first valley V1. That is, the roof layer 360 is not formed between the first subpixel area PXa and the second subpixel area PXb. The microcavity 305 is formed below each roof layer 360 in each of the first subpixel area PXa and the second subpixel area PXb. In the second valley V2, the microcavity 305 is not formed below the roof layer 360, but formed to be attached to the substrate 110. Accordingly, a thickness of the roof layer 360 disposed at the second valley V2 may be larger than a thickness of the roof layer 360 disposed in each of the first subpixel area PXa and the second subpixel area PXb. An upper surface and opposing sides of the microcavity 305 formed to be covered by the roof layer 360.

An injection hole 307 exposing a part of the microcavity 305 is formed in the common electrode 270, the third insulating layer 340, and the roof layer 360, respectively. The injection holes 307 may be formed to face each other at the edges of the first subpixel area PXa and the second subpixel area PXb. For example, the injection holes 307 may be formed to correspond to a lower side of the first subpixel area PXa and an upper side of the second subpixel area PXb to expose a side of the microcavity 305. The microcavity 305 is exposed by the injection hole 307, and an aligning agent or a liquid crystal material is injected into the microcavity 305 through the injection hole 307.

An overcoat 390 is disposed on the entire surface of the roof layer 360 and on the injection hole 307. The overcoat 390 covers the injection hole 307 that exposes a portion of the microcavity 305 to the outside. The overcoat 390 seals the microcavity 305 such that the liquid crystal molecules 310 contained in the microcavity 305 may not be discharged outside. Since the overcoat 390 contacts the liquid crystal molecules 310, the overcoat 390 may be made of a material that is not reactive with the liquid crystal molecules 310.

Although not illustrated, polarizers may be further formed on the upper and lower sides of the display device. The polarizers may be formed with a first polarizer and a second polarizer. The first polarizer may be attached onto the lower side of the substrate 110, and the second polarizer may be attached onto an overcoat 390. Since the display device may provide a flat surface by the overcoat 390, the polarizer may be stably attached to the display panel.

Figure 7:
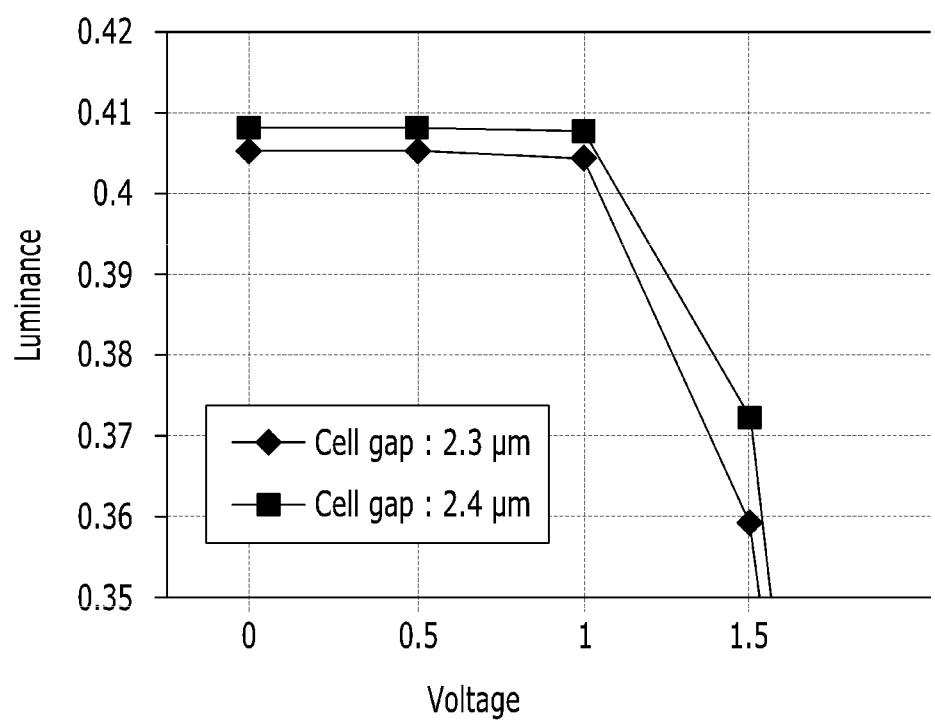
FIG. 7 is a graph illustrating results of measuring luminance of a curved display device, according to an exemplary embodiment of the present disclosure.

Next, experimental luminance results with respect to each of the cell gaps h1 and h2 of the curved display device will be described with reference to FIG. 7. FIG. 7 is a graph illustrating results of measuring luminance of the curved display device, according to the exemplary embodiment of the present disclosure. A horizontal axis of FIG. 7 represents voltage, and a vertical axis thereof represents luminance.

When a cell gap is relatively small (i.e., 2.3 μm), luminance at the same voltage is relatively lower than when a cell gap is relatively larger (i.e., 2.4 μm). In the case of the curved display device, since the edge cell gap h2 is small at the substrate 110, low luminance at the edge portion of the substrate 100 is compensated by light leakage of birefringence at the edge, and thus luminance of the edge portion may be the same as that of the center portion. In addition, by forming the edge cell gap h2 small to lower luminance of the edge portion, light leakage at the edge portion may be prevented.

As described above, according to the exemplary embodiment of the present disclosure, the curved display device is manufactured using one substrate, thereby reducing weight, thickness, cost, and manufacturing process time thereof, and improving light leakage at an edge portion thereof through an adjustment of cell gaps.

While the present disclosure has been described in connection with what is presently considered to be practical exemplary embodiments, it is to be understood that the present disclosure is not limited to the described embodiments, but, on the contrary, is intended to cover various modifications and equivalent arrangements included within the spirit and scope of the present disclosure.

<Description of symbols>

| | |
|---|---|
| 11: first alignment layer | 21: second alignment layer |
| 110: substrate | 121: gate line |
| 124h: first gate electrode | 124l: second gate electrode |
| 124c: third gate electrode | 131: storage electrode line |
| 140: gate insulating layer | 171: data line |
| 191: pixel electrode | 191h: first subpixel electrode |
| 191l: second subpixel electrode | 220: light blocking member |
| 230: color filter | 240: first insulating layer |
| 270: common electrode | 300: sacrificial layer |
| 305: microcavity | 307: injection hole |
| 310: liquid crystal molecule | 340: second insulating layer |
| 370: third insulating layer | 390: overcoat |

What is claimed is:

1. A curved display device comprising:
   a substrate including a display area;
   a plurality of thin film transistors disposed on the substrate;
   a plurality of pixel electrodes respectively connected to the plurality of thin film transistors;
   a liquid crystal layer disposed on the plurality of pixel electrodes and filling a plurality of microcavities;
   a common electrode facing the plurality of pixel electrodes and separated with the plurality of microcavities; and
   a roof layer formed on the common electrode,
   wherein the plurality of microcavities are formed in a matrix form including a plurality of columns and a plurality of rows,
   the display area includes an edge portion and a center portion, and
   a first height of the plurality of microcavities formed at the edge portion of the display area is lower than a second height of the plurality of microcavities formed at the center portion of the display area.

2. The curved display device of claim 1, wherein heights of the plurality of microcavities are gradually higher toward the center portion from the edge portion.

3. The curved display device of claim 2, wherein a difference of the heights of the plurality of microcavities is formed in a long side direction or a short side direction of the substrate.

4. The curved display device of claim 3, wherein the first height of the plurality of microcavities formed at the edge portion of the display area is about 2.5-2.8 μm, and
   the second height of the plurality of microcavities formed at the center portion of the display area is about 3-5 μm.

5. The curved display device of claim 3, wherein
the roof layer includes an injection hole that exposes the plurality of microcavities and is separated from the plurality of microcavities.

6. The curved display device of claim 5, further comprising
an alignment layer formed on an inner surface of the plurality of microcavities.

7. The curved display device of claim 6, further comprising
an overcoat formed on an entire upper surface of the roof layer and covering the injection hole.

8. The curved display device of claim 2, wherein
a difference of the heights of the plurality of microcavities is formed in a long side direction and a short side direction of the substrate.

9. The curved display device of claim 8, wherein
the first height of the plurality of microcavities formed at the edge portion of the display area is about 2.5-2.8 µm, and
the second height of the plurality of microcavities formed at the center portion of the display area is about 3-5 µm.

10. The curved display device of claim 8, wherein
the roof layer includes an injection hole that exposes the plurality of microcavities and is separated from the plurality of microcavities.

11. The curved display device of claim 10, further comprising
an alignment layer formed on an inner surface of the plurality of microcavities.

12. The curved display device of claim 11, further comprising
an overcoat formed on an entire upper surface of the roof layer and covering the injection hole.

* * * * *